(12) United States Patent
Shiina

(10) Patent No.: US 6,813,990 B2
(45) Date of Patent: Nov. 9, 2004

(54) PISTON UNIT WITH A PISTON SKIRT COMPRISING TWO RINGS JOINTED BY JOINT ELEMENTS AT ANGULARLY-SPACED POSITIONS

(75) Inventor: Masaki Shiina, Macbashi (JP)

(73) Assignee: Sanden Corporation, Gunma (JP)

( * ) Notice: Subject to any disclaimer, the term of this patent is extended or adjusted under 35 U.S.C. 154(b) by 51 days.

(21) Appl. No.: 10/394,245

(22) Filed: Mar. 24, 2003

(65) Prior Publication Data

US 2003/0177900 A1 Sep. 25, 2003

(30) Foreign Application Priority Data

Mar. 25, 2002 (JP) ......................................... 2002-083598

(51) Int. Cl.[7] .............................................. F04B 27/00
(52) U.S. Cl. ............................................. 92/71; 92/172
(58) Field of Search .......................... 92/12.2, 71, 172, 92/248, 255, 257, 258

(56) References Cited

U.S. PATENT DOCUMENTS

| | | |
|---|---|---|
| 4,095,921 A | 6/1978 | Hiraga et al. |
| 4,697,992 A | 10/1987 | Hatakeyama et al. |
| 4,835,856 A | 6/1989 | Azami |
| 5,169,162 A | 12/1992 | Azaml et al. |
| 5,630,353 A * | 5/1997 | Mittlefehldt et al. .......... 92/71 |
| 5,953,980 A * | 9/1999 | Ota et al. ...................... 92/71 |

FOREIGN PATENT DOCUMENTS

| | | |
|---|---|---|
| JP | 10299655 | 10/1998 |
| JP | 274350 | 3/2000 |

* cited by examiner

*Primary Examiner*—Thomas E. Lazo
(74) *Attorney, Agent, or Firm*—Baker Botts L.L.P.

(57) ABSTRACT

A piston unit (10) comprises a piston (10a) and a connecting element (5). The piston comprises a piston head (1) comprising a compression surface (1a1) and a skirt portion. The skirt portion comprises a first and second ring (2, 3) apart form each other in the axial direction. The first and second rings (2, 3) are jointed to each other by jointing members (4a) at angularly-spaced positions with widows being left between the first and the second rings (2, 3). The piston head (1) is made of resin and is fixedly mounted at an axial end of the first ring and the connecting element (5) is fixed to the opposite axial end of the second ring (3). The connecting element (5) comprises four plates (5b, 5c) combined to form a cross in cross section. The four plates (5b, 5c) connect the axial end of the second ring (3) at angularly-spaced positions.

25 Claims, 15 Drawing Sheets

PISTON UNIT WITH A PISTON SKIRT COMPRISING TWO RINGS JOINTED BY JOINT ELEMENTS AT ANGULARLY-SPACED POSITIONS

This application claims priority to prior application JP 2002-83598, the disclosure of which is incorporated herein by reference.

BACKGROUND OF THE INVENTION

The present invention relates to a piston unit, which is installed in a piston compressor, and in particular, to such a piston unit with a reduced weight.

Generally speaking, a piston unit comprises a piston and a piston rod connected to the piston. The piston rod is also called a connecting element and is for connecting the piston with an external drive or driven object. The piston comprises a piston head comprising a compression surface and a piston skit, portion. The piston skirt portion is connected to the piston head and serves to guide the piston without inclination in a cylinder.

There is a need for a light-weight piston unit for use in a piston compressor. To meet the need, various types of pistons unit are developed. For example, JP-A 10-299655 or 2000-274350 discloses a piston unit where the piston skirt portion is partially cut away to form side opens axially extending from the rear end. In the structure, the skirt portion is low in rigidity and mechanical strength. Accordingly, the wall thickness of the skirt portion is required large, which results in the insufficient reduction of weight of the piston unit.

SUMMARY OF THE INVENTION

It is an object of the present invention to provide a piston unit which is reduced in weight without substantial degradation of mechanical strength of the piston skirt portion.

This invention is directed to a piston unit comprising a piston, which has a compression end surface, and a connecting element, which is fixed to the piston and extends therefrom opposite to the compression end surface. The piston has a piston outer diameter. According to the invention, the piston comprises:

a first ring having an outer diameter equal to the piston outer diameter and having a first axial end and a second axial end opposite to the first axial end;

a second ring having an outer diameter equal to the piston outer diameter and having a third axial end and a fourth axial end;

joint member jointing the first and the second rings to each other between the second axial end of the first ring and the third axial end of the second ring at angularly-spaced positions, so that the first and second rings are disposed on the same center axis and apart from each other in the axial direction, and a circular disk member fixedly mounted in and closing the first axial end of the first ring, and having an exposed surface, as a compression end surface, out of the first ring.

The connecting element is fixed to the fourth axial end of the second ring at angularly-spaced positions.

In the piston unit according to this invention a piston head comprises the circular disk member, and the skirt portion comprises the first ring and the second ring jointed by the joint members at angularly-spaced positions. The piston has angularly-spaced windows in the skirt portion and is, therefore, reduced in the weight.

The skirt portion is supported by connecting member connected to the second ring at angularly-spaced positions. Therefore, the skirt portion is not degraded by presence of the windows.

Further objects, features and advantages of the present invention will be understood from the following description of embodiments of the invention in connection with figures.

DESCRIPTION OF PREFERRED EMBODIMENTS

Figure 1:
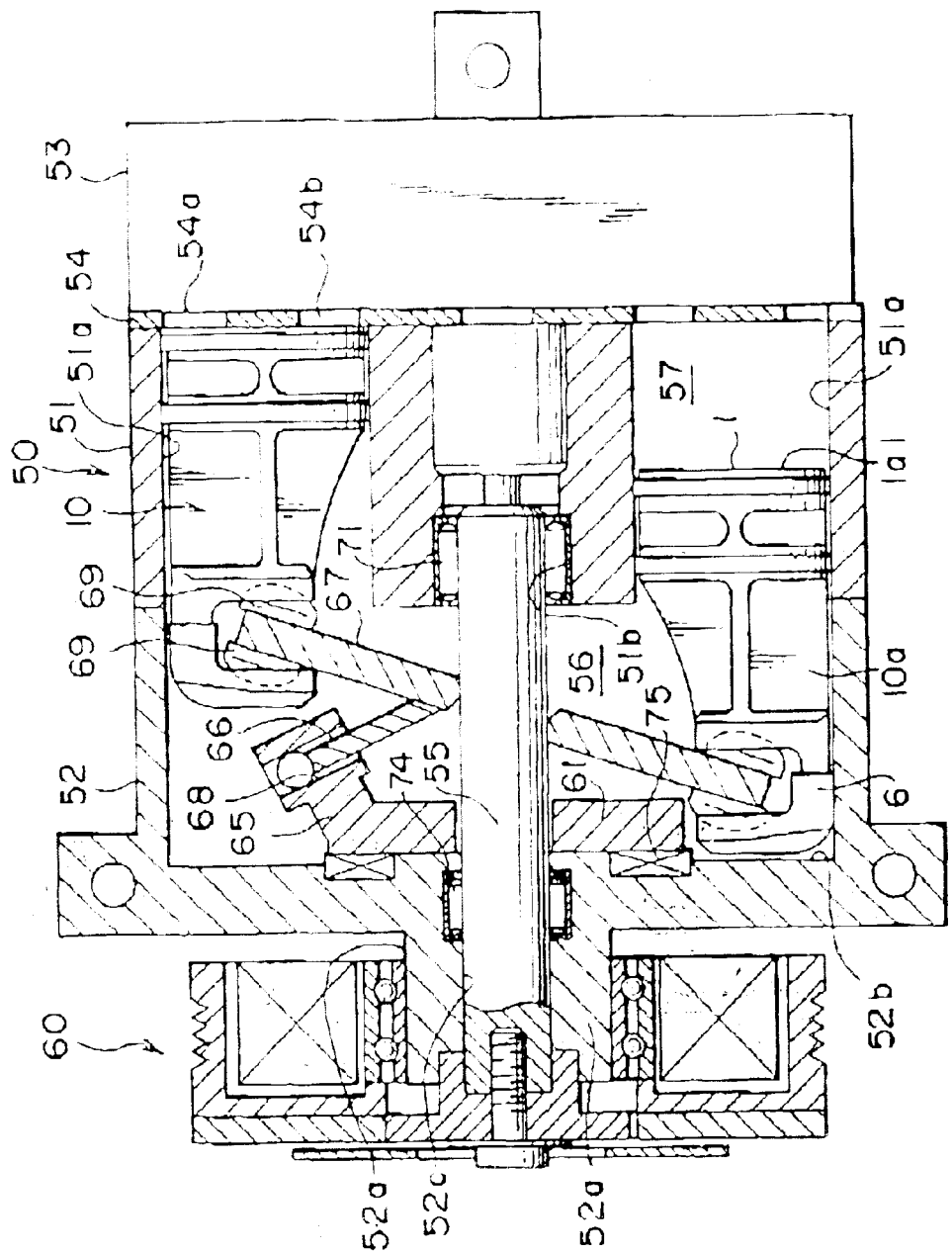
FIG. 1 is a sectional view showing a piston compressor, which comprises piston units according to a first embodiment of the present invention.

With reference to FIG. 1, a piston compressor 50 is of a swash-plate type and includes a plurality of piston units 10 according to a first embodiment of the present invention. First, the compressor 50 is explained as a whole and, then, the piston unit 10 of the present embodiment is explained.

The compressor 50 comprises a cylinder block 51 and a front housing 52, which is fitted to a front end of the cylinder block 51. The cylinder block 51 and the front housing 52 define a crank chamber 56. The front housing 52 has a boss portion 52a which projects toward the left side of FIG. 1. On the boss portion 52a, an electromagnetic clutch 60 is mounted. The cylinder block 51 and the front housing 52 have center holes 51b, 52c, respectively, and together support a drive shaft 55 by means of radial bearings 71, 74 fitted within the respective center holes 51b, 52c so that the drive shaft 55 can rotate. The drive shaft 55 extends in the axial direction. One end of the drive shaft 55 penetrates the front housing 52 and is connected to the electromagnetic clutch 60 so that a rotation force is transmitted from a driving source, e.g. an engine for vehicle, to the drive shaft 55 by means of the electromagnetic clutch 60.

The cylinder block 51 is also provided with a plurality of cylinder bores 51a, which extend in the axial direction from a rear end of the cylinder block 51 to the crank chamber 56. The number of the cylinder bores 51a is an odd, for example, seven in this embodiment. The cylinder bores 51a define cylinders 57 for the piston units 10, respectively, together with a surface of a valve plate 54 which is mounted on a rear end of the cylinder block 51. The piston units 10 are inserted into the respective cylinders 57 so as to be able to slide and reciprocate in the respective cylinders 57 along the axial direction. In this embodiment, each of the piston units 10 has a piston, which has a constant surface contact with an inner surface of the cylinder 57, i.e. with the cylinder bore 51a. In other words, a periphery of a piston of the piston unit 10 is always and wholly surrounded by the cylinder bore 51a.

The valve plate 54 is formed with a plurality of pairs of a suction port 54a and a discharge port 54b. Each pair of the suction port 54a and the discharge port 54b is arranged so as to correspond to the cylinder 57. On a rear side of the valve plate 54, a rear housing 53 is mounted. The rear housing 53 defines a suction chamber and a discharge chamber, which are not shown in FIG. 1. The suction ports 54a communicate with the suction chamber, while connected to the respective cylinders 57 via suction valves, which are not shown in FIG. 1. The discharge ports 54b communicate with the respective cylinders 57, while connected to the discharge chamber via discharge valves, which are not shown in FIG. 1.

In the crank chamber 56, a rotor 61 is mounted and fixed on the drive shaft 55 so as to rotate when the drive shaft 55 rotates. The rotor 61 is also supported via a thrust bearing 75 by an inner surface 52a of the front housing 52 in the axial direction. The rotor 61 has an arm portion 65 provided with a hole 68. On the main shaft 55, a swash plate 67 is mounted. The swash plate 67 is provided with another arm portion 66. One end of the arm portion 66 has a ball shape and is inserted into the hole 68 so as to be able to move within the hole 68. The arm portion 65 of the rotor 61 and the arm portion 66 of the swash plate 67 together form a hinge mechanism for the swash plate 67.

On a peripheral part of the swash plate 67, a plurality of pairs of shoes 69 are arranged at regular intervals. The peripheral part of the swash plate 67 is interposed between each of pairs of shoes, 69 so as to be able to slide between the pairs of shoes 69. The pairs of shoes 69 are supported by the pistons 10. Thus, the swash plate 67 is coupled to the piston units 10 via the respective pairs of shoes 69.

With the above-mentioned structure, when the drive shaft 55 rotates, the swash plate 67 also rotates. When the swash plate 67 rotates, each pair of shoes 69 goes forwards or rearwards in accordance with the part of the awash plate 67, which is interposed the pair of shoes 69. Each of the piston units 10 moves according to the movement of the corresponding pair of shoes 69 in the axial direction. Thus, the piston units 10 reciprocate within the respective cylinders 57 along the axial direction. By the reciprocating motions of each piston unit 10, a fluid object, such as a gas, is sucked from the suction chamber through the corresponding suction port 54a to the corresponding cylinder 57, is compressed within the corresponding cylinder 57, and then is discharged from the corresponding cylinder 57 through the corresponding discharge port 54b to the discharge chamber.

With reference to FIGS. 2 to 12, the piston unit 10 comprises a piston 10a and a connecting element or a connecting portion 5. The piston 10a comprises a circular disk member 1 as a compression member or a piston head, a first ring 2 fixed with the compression member 1, a second ring 3, and a joint portion 4 jointing the second ring 3 to the first ring 2. The first ring 2, the second ring 3 and joint portion 4 constitute a, so called, skirt portion of the piston 10a. The connecting portion 5 is one corresponding to a, so called, piston rod and has a tail portion 6. In the shown, embodiment, the tail portion 6 has a structure for connecting piston 10a to the swash plate 67 through shoes 69.

In this embodiment, the first ring 2, the second ring 3, 4 and the connecting portion 5 are formed integral with each other to form a single body, which will be referred to as a other body member 10b. The body member 10b is made of metal. In this embodiment, the material of the body member 10b is light alloy.

Figure 2:
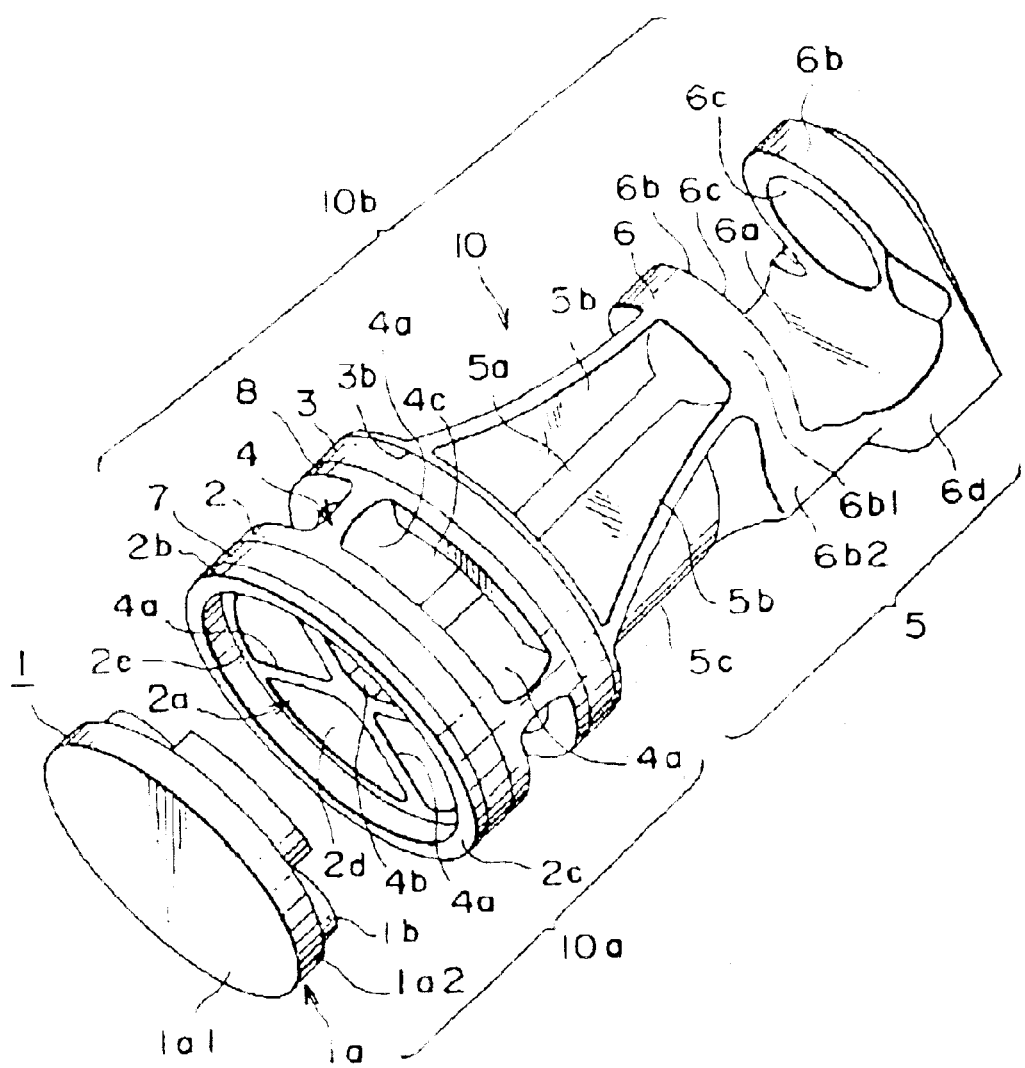
FIG. 2 is an exploded, perspective view showing the piston unit of FIG. 1.
Figure 3:
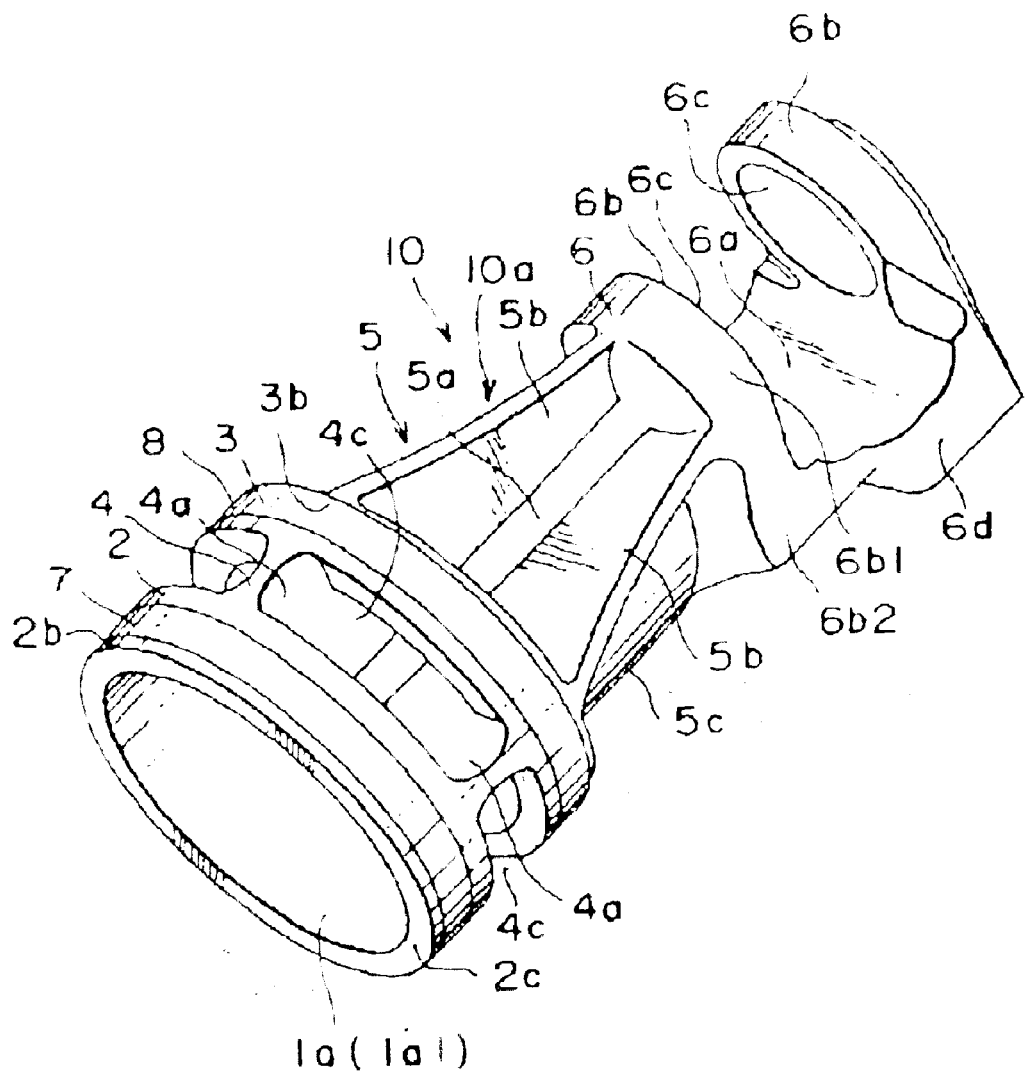
FIG. 3 is a perspective view showing, the piston unit of FIG. 2 in an assembled state.
Figure 9:
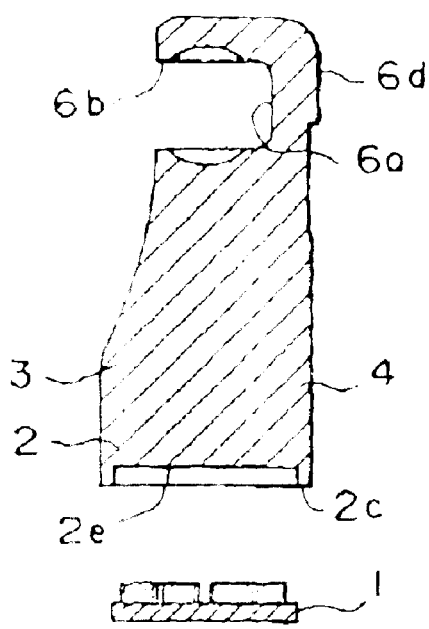
FIG. 9 is a sectional view of the piston unit taken along lines IX—IX of FIG. 5.
Figure 10:
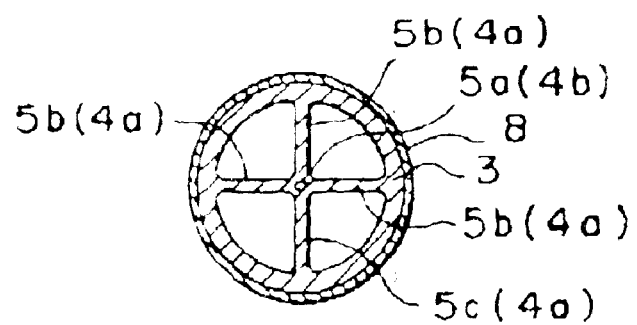
FIG. 10 is a sectional view of the piston unit taken along lines X—X of FIG. 5
Figure 11:
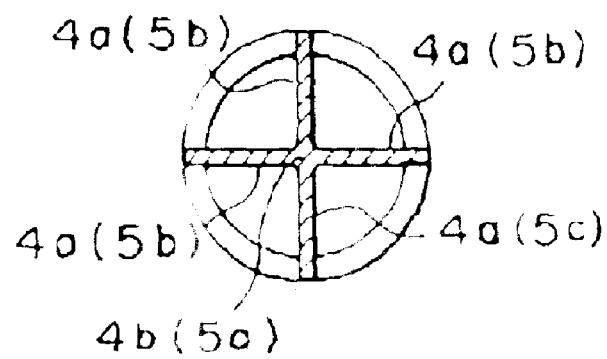
FIG. 11 is a sectional view of the piston unit taken along lines XI—XI of FIG. 5.

The first ring 2 defines a hole 2a therein and has an predetermined axial length. The first ring 2 also has an outer diameter equal to an outer diameter of the piston 10a, and has a first axial end 2c and a second axial end opposite to the first axial end 2c. The hole 2a is defined by a first inner diameter of the ring at a side of the first axial end 2c and connected with a small hole at a side of the second axial end of the first ring 2. The small hole is defined by a second inner diameter smaller than the first inner diameter. Accordingly, the first ring has a step 2e on the inner wall thereof, as shown in FIGS. 2 and 9. The circular disk member 1 is fixedly mounted to the first ring to close the hole 2a at the first axial end 2c. The second ring 3 has the same inner diameter and the same outer diameter as the second inner diameter and the outer diameter of the first ring 2 and has a predetermined axial length. The second ring 3 also has opposite axial ends, which will be third and fourth axial ends. The joint portion 4 joints the first ring 2 and the second ring 3 at angularly spaced positions, so that the first ring 2 and the second ring 3 are disposed on the same axis while the second axial end of the first ring 2 faces the third axial end of the second ring 3 in the axial direction. The connecting portion 5 connects with the fourth axial end of the second ring 3, and therefore supports the first and second rings 2 and 3 jointed by the joint portion 4. The tail portion 6 is formed at an axial end of the connecting portion 5 opposite to the, second ring 3 in the axial direction.

Figure 4:
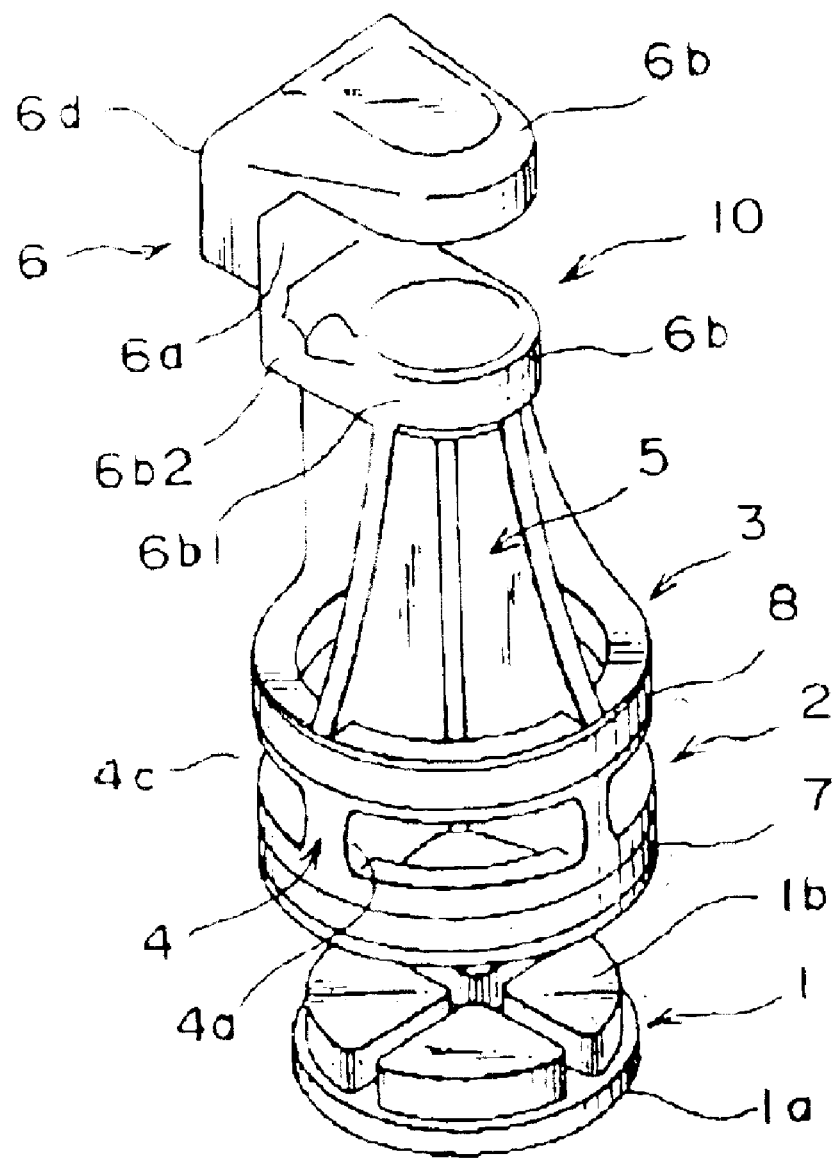
FIG. 4 is another exploded, perspective view showing the piston unit of FIG. 2.
Figure 5:
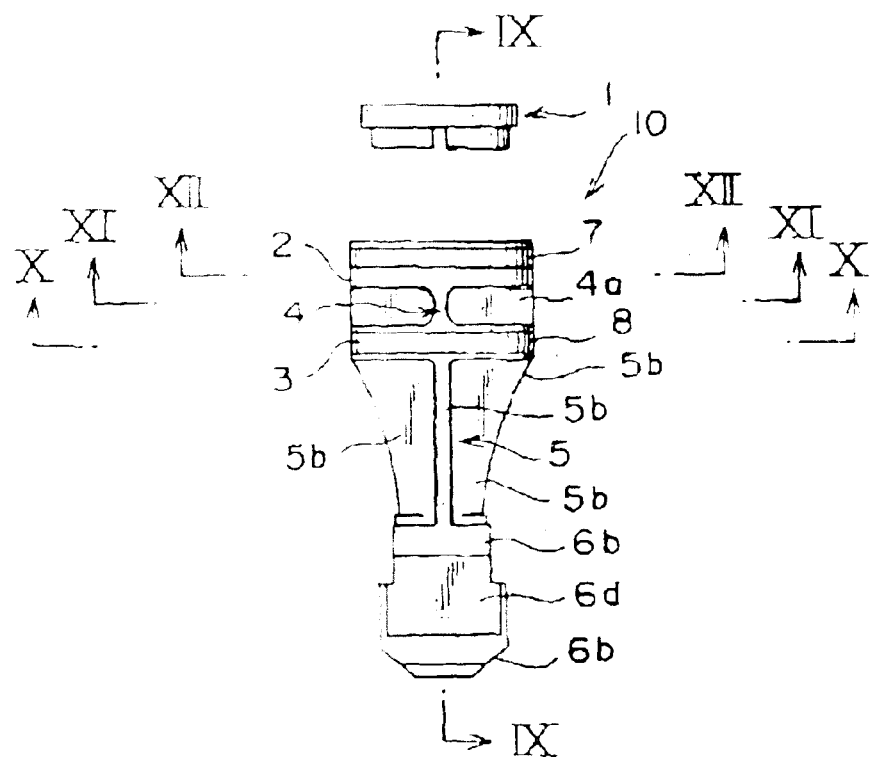
FIG. 5 is a top plan view showing the piston unit of FIG. 2.
Figure 6:
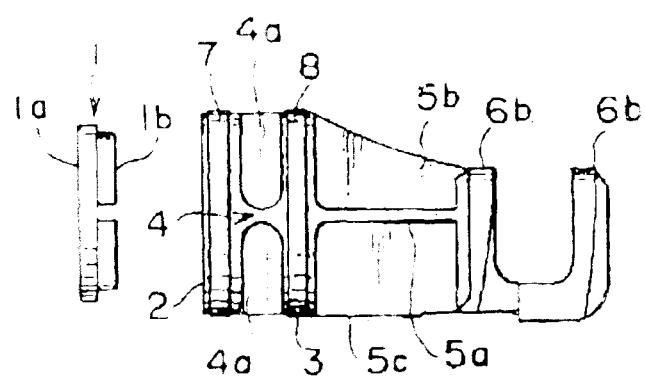
FIG. 6 is a left side view showing the piston unit of FIG. 2.
Figure 7:
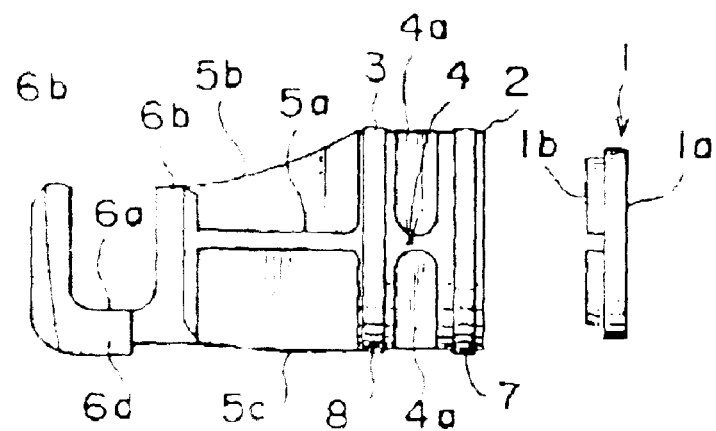
FIG. 7 is a right side view showing the piston unit of FIG. 2.
Figure 8:
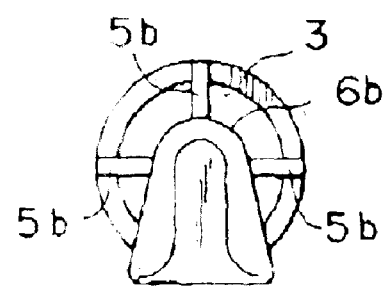
FIG. 8 is a rear view showing the piston unit of FIG. 2.

The tail portion 6 comprises two side portions 6b and a bottom portion 6d, which connects the side portions 6b. Each of the side portions 6b has a shape like a circular disc portion 6b1 which continues at one half to a rectangular plate portion 6b2 as shown in FIG. 4. The rectangular plate portion 6b2 constitutes an extension of a half of the circumferential part of the circular disc portion 6b1 to the bottom portion 6d. The circular disc portion 6b1 has an outer diameter smaller than the outer diameter of the ring portion 3. The circular disc portions 6b1 are formed with depressions 6c, respectively, on surfaces thereof, which face each other. The depressions 6c serve to accommodate a pair of the shoes 69 so that the tail portion 6 serves as a shoe supporter for supporting the pair of the shoes 69. The bottom portion 6d connects the rectangular plate portions 6b2 in the axial direction. An inner surface 6a of the bottom portion 6d is not in contact with the pair of shoes 69 when the tail portion 6 supports the pair of shoes 69.

The connecting portion 5 is comprised of a center portion 5a and four plate portions 5b, 5c, as shown in FIG. 2. The center portion 5a extends in the axial direction from a center of the circular disc portion 6b1 of the tail portion 6 to a center of the second ring 3. Three plate portions 5b have the same shape. Each of the plate portions 5b has two edges, one of which is connected to the center portion 5a, while the other is slanted so as to extend from a periphery of the circular disc portion 6b1 of the tail portion 6 to a periphery of the second ring 3. The other plate portion 5c has two edges, both of which are parallel to each other. One edge of the plate portion 5c is connected to the center portion 5a. The other edge of the plate portion 5c continues from a periphery of the rectangular plate portion 6b2 to the periphery of the second ring 3. Every plate portions 5b, 5c is also connected to the radial inner surface and the fourth axial end surface of the second ring 3. The connecting portion 5 has a cruciform section and is smaller than the first and second rings 2 and 3 in the radial direction. Each of the three plate portions 5b has two side surfaces, each of which shows a trapezium, as seen from a direction perpendicular to the plate portion 5b. The other plate portion 5c has two side surfaces, each of which shows a rectangular, as seen from a direction perpendicular to the plate portion 5c. Those are clearly illustrated in FIG. 5, 6 or 7.

The joint portion 4 is comprised of four joint plates 4a connecting the first ring 2 and the second ring 3 at four positions of angular intervals of 90°. Those joint plates 4a are combined to form a cruciform shape with a cross portion as a center portion 4b and is disposed in and coaxial with the first ring and second ring 2 and 3. Each of the joint plates 4a radially extends to connect with the radial inner surface of each of the first and second rings 2 and 3. The joint plate 4a radially further extends between the second axial end of the first ring 2 and the third axial end of the second ring 3 so that its extending end is flush with the outer surfaces of those rings. The joint plate 4a, is connected to the second and third axial ends of those rings 2 and 3 to form a pillar portion connecting the second and the third axial end. Accordingly, the four joint plates, 4a define four side holes or windows 4c between the first ring 2 and the second ring 3. The side holes 4c communicate with a space defined by the plate portions 5b, 5c of the connecting portion 5.

Those joint plates 4a and the center portion 4b are formed integral with, and as extensions of, the plate portions 5b and 5c and the center portion 5a, respectively. Accordingly, the joint plates 4a and center portion 4b are also shown by 5b, 5c and 5a, in FIGS. 10–12.

Figure 12:
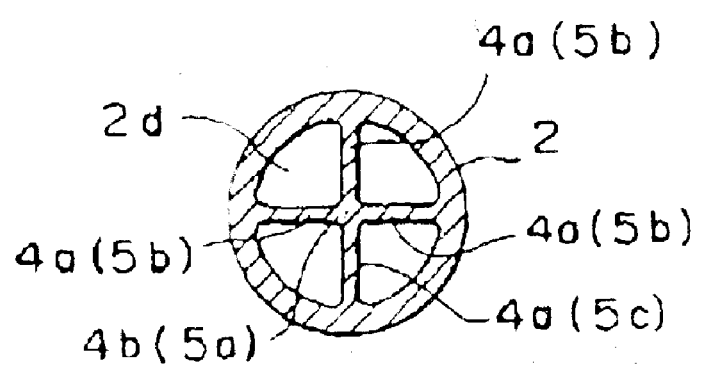
FIG. 12 is a sectional view of the piston unit taken along lines XII—XII of FIG. 5.

The joint plates 4a axially extend to the inner step 2e in the first ring 2 and is connected to a radial inner surface of the first ring 2, as shown in FIGS. 2 and 12. The joint plates 4a define four holes 2d together with the radial inner surface of the first ring 2. Each of the holes 2d has a sectional shape like a quarter-circle and communicates with the hole 2a in the first ring 2.

The compression member 1 is made of resin and has a disc portion 1a and a plurality of (in this embodiment, four) bulges 1b, as shown in FIGS. 2 and 4. The disc portion 1a has a diameter same as the inner diameter of the holder portion 2. The disc portion 1a has two surfaces, one of which constitutes a compression surface 1a1 for compressing a fluid object in the cylinder 57 of the compressor 50. The bulges 1b are formed on the other surface of the disc portion 1a. Each of the bulges 1b has a quarter-circle like cross-section in a plane perpendicular to the axial direction. The cross-section of the bulge 1b corresponds to the shape of the hole 2d.

The compression member 1 may be made of a metal of a light alloy. In other structure, one of the disc portion 1a and the bulge 1b may be made of resin, with the other being made of metal.

The compression member 1 is fitted into the hole 2a in the first ring 2 to be stopped by the inner step 2e, so that the first axial end surface 2c of the first ring 2 and the compression surface 1a1 are flush with each other. The bulges 1b are fitted within the holes 2d, respectively, and a periphery 1a2 of the disc portion 1a is wholly surrounded by the radial inner surface of the first ring 2. Each of axial ends of the joint plates 4a is fitted between the corresponding two bulges 1b.

The compression member 1 is fixed to the first ring 2 by the use of an adhesive agent in this embodiment. The compression member 1 may be formed in a resin-casting process or direct-molding of resin. For example, supplementary plates are inserted through the side holes 4c so as to constitute temporary bottoms of the holes 2d in the axial direction. A resin material is cast into the hole 2a and the holes 2d, accordingly, until the first ring 2 is filled with the resin material. When the resin material is hardened, the similar structure of the compression member 1 can be obtained, as a cast body, at the first axial end of the first ring.

In a periphery 2b of the first ring 2, an annular groove, not shown, is formed, and a first piston ring 7 is fitted thereto. The first piston ring 7 mainly serves as a seal member. In a periphery 3b of the ring portion 3, another annular groove, not shown, is formed, and a second piston ring 8 is fitted thereto. The second piston ring 8 mainly serves to prevent an inclination of the piston 10. In this embodiment, the first and the second piston rings 7 and 8 have the same thickness in the radial direction but may have thickness different from each other. If the first piston ring 7 is thicker than the second piston ring 8, the sealing becomes more effective. If the second piston ring 8 is thicker than the first piston ring 7, it is resistant to a reaction force of a compressed gas. Each of the first and the second piston rings 7 and 8 is made of metal and has a shape which is like a ring but lacks a part of the ring. That is, the first and the second piston rings 7, 8 are incomplete rings (C-shape rings) in this embodiment. Each of the first and the second piston rings 7, 8 may be made of resin and/or may have a shape of a complete ring (O-shape ring).

With this structure, the skirt portion of the piston 10a comprises two rings 2 and 3 and joint portion 4 jointing the two rings at angularly spaced positions. The piston 10a has side holes 4c communicating with the inner cavities. Therefore, piston 10a comprising a piston head 1 and the skirt portion can be reduced in weight. Further, the connecting portion comprises four plates connecting to the inner side of the two rings. Accordingly, the two rings 2 and 3 can be reduced in the radial thickness while maintaining their sufficient rigidity. Accordingly, the piston unit 10 comprising the piston 10a and the connecting portion 5 can be also reduced in weight. Furthermore, when the compression member 1 is made of resin, the piston 10a becomes lighter. In the axial direction, the piston 10a has an effective length, which is determined by the distance between the first axial end 2c of the first ring 2 and the fourth axial end of the second ring 3. Because the joint portion 4 is interposed between the first ring 2 and the second ring 3, the effective length of the piston 10a can be longer although a contact surface with the cylinder 57 is small due to the existence of the side holes 4c. Because the periphery of the resinous compression member 1, which is made of resin, is wholly surrounded by the first ring 2, it is not in contact with the cylinder bore 51a. Therefore, the compression member 1 is impervious to being damaged during the reciprocating motion of the piston 10a.

With reference to FIGS. 13 to 23, a piston unit 20 according to a second embodiment is a modification of the piston unit 10 in FIGS. 2–12 and generally has the similar structure of the piston unit 10 except differences in the joint portion and the connecting potion. Therefore, in the general structure, the piston unit 20, as is similar to the piston unit 10, comprises a piston 20a and a connecting portion 15. The connecting portion 15 has a tail portion 16 at its axial tail end. The piston 20a comprises a circular disk member 11 as a compression member or a piston head, and a skirt portion. The skirt portion comprises a first ring 12, a second ring 13 and joint portion 14 jointing the first and second rings 12 and 13. The first ring 12, the second ring 13 and the connecting portion 15 are formed integral with each other to form a single body, which will be referred to as a body member 20b.

The piston unit 20 can be installed in the compressor 50. The reference signs in FIG. 1 are cited in the following explanation concerning the similar elements of the compressor 50.

The first ring 12, as is similar to the ring 2, has a first axial end 12c, a second axial end opposite to the first axial end 12c, and an inner hole 12a defined therein. In detail, the hole 12a comprises a first hole 12a1 with a large inner diameter at a side of the first axial end 12c and a second hole 12a2 with a small inner diameter at a side of the second axial end, so that the first and second holes 12a1 and 12a2 connect to each other through an inner step 12e formed in the inner wall of the first ring 12. The second ring 13 is similar to the ring 3 in the first embodiment.

The connecting portion 15 has the tail portion 16, which is similar to the tail portion 6 in the first embodiment. Various portions 16a–16d of the tail portion 16 are similar to portions 6a–6d of the tail portion 6. Accordingly, the description thereto is omitted here.

Figure 13:
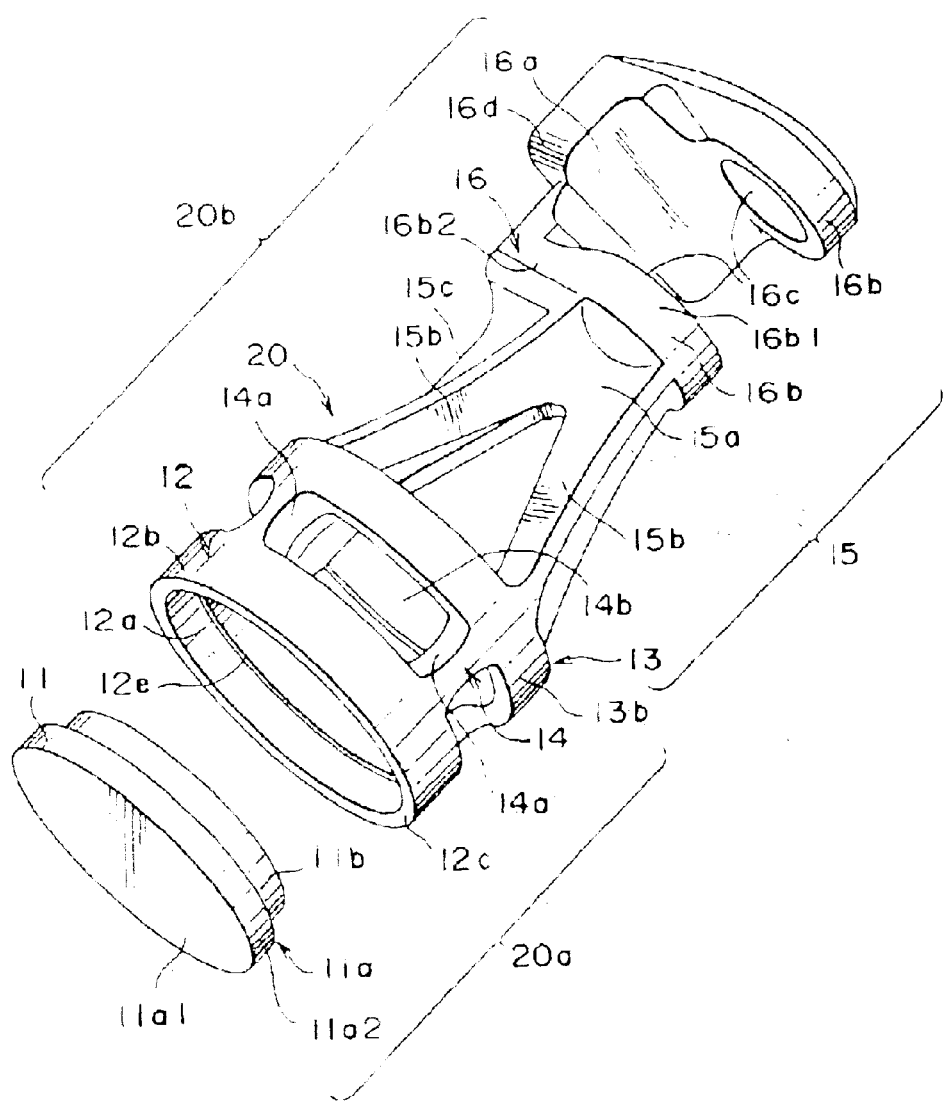
FIG. 13 is an exploded, perspective view showing a piston unit according to a second embodiment of the present invention.
Figure 14:
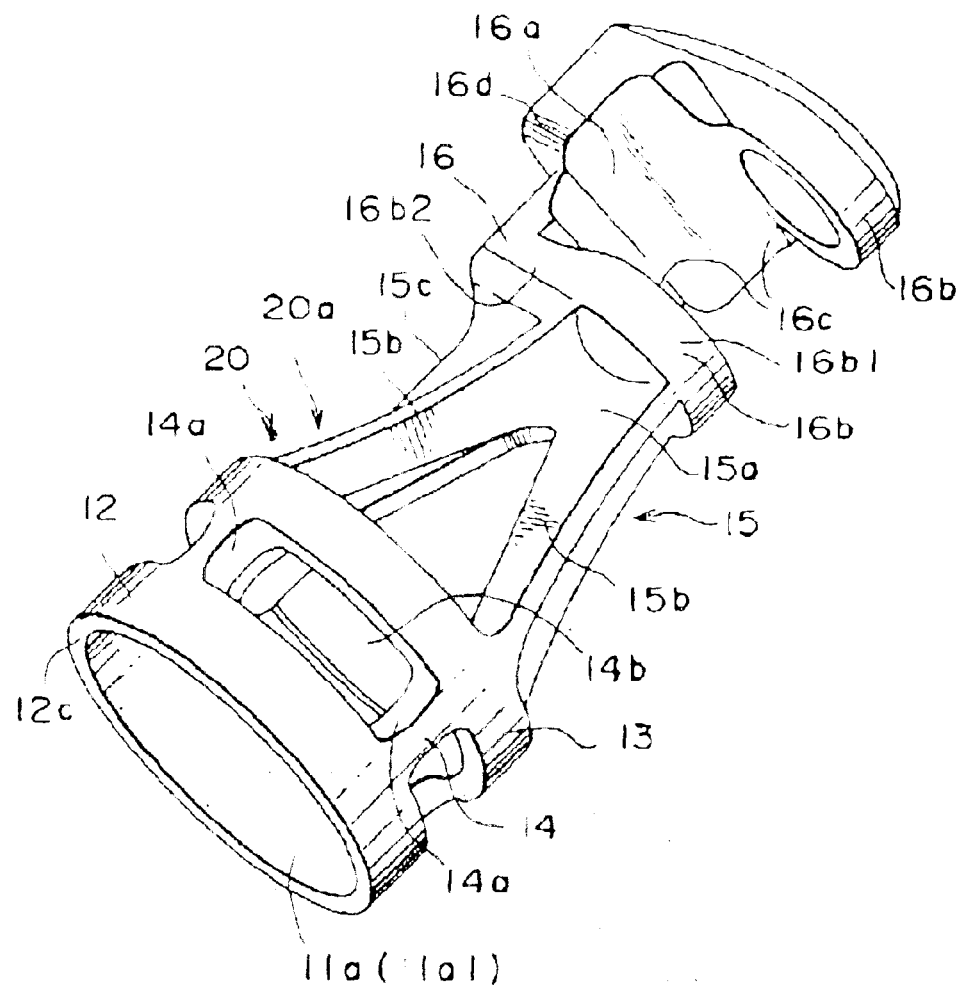
FIG. 14 is a perspective view showing the piston unit of FIG. 13 in an assembled state.

The connecting portion 15 is also comprised of a center portion 15a and four plate portions 15b and 15c, as shown in FIG. 13. The plate portions 15a–15c are different from the plate portions 5a–5c in the first embodiment in a fact that they do not continuously connect to each other over the axial length but extend away from each other toward the second ring 13. The center portion 15a extends in the axial direction from a center of the circular disc portion 16b1 of the tail portion 16 but does not reach the second ring 13. Three of the plate portions 15b have the same shape. Each of the plate portions 15b has two edges. One edge of the plate portion 15b is partially connected to the center portion 15a and further extends from the center portion 15a to an inner edge of the fourth axial end of the second ring 13. The other edge of the plate portion 15b extends from a periphery of the circular disc portion 16b1 of the tail portion 16 to an outer-edge of the fourth axial end of the second ring 13. The other plate portion 15c has two edges. One edge of the plate portion 15c is partially connected to the center portion 15a and further extends from the center portion 15a to the inner surface of the ring portion 13. The other edge of the plate portion 15c continues from a periphery of the rectangular plate portion 16b2 the outer edge of the fourth axial end of the second ring 13. Every plate portions 15b and 15c is also connected to the fourth axial end surface of the second ring 13. The connecting portion 15 is smaller than the first ring 12 and the second ring 13 in the radial direction. Each of the three plate portions 15b has two side surfaces, each of which shows a specific pentagon, as seen from a direction perpendicular to the plate portion 15b. The specific pentagon has an elongated shape with one right angle corner. The other plate portion 15c has two side surfaces, each of which shows a trapezium, as seen from a direction perpendicular to the plate portion 15c. Those are clearly illustrated in FIG. 16, 17 or 18.

Figure 22:
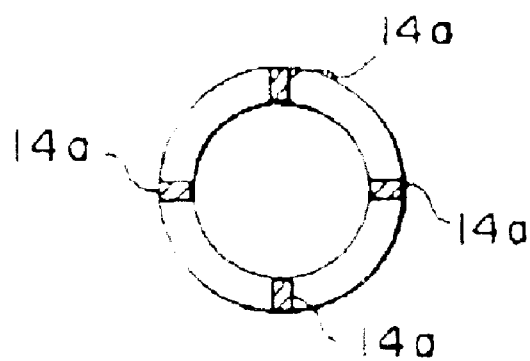
FIG. 22 is a sectional view of the piston unit taken along lines XXII—XXII of FIG. 16.
Figure 23:
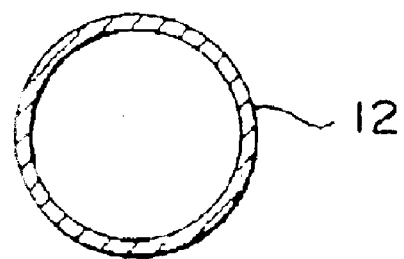
FIG. 23 is a sectional view of the piston unit taken along lines XXIII—XXIII of FIG. 16.

The joint portion 14 is different from the joint portion 4 in the first embodiment in a fact that it has no cruciform structure. The joint portion 14 is comprised of four small joint plates or pillars 14a, as shown in FIGS. 13 and 22. The four joint pillars 14a extend between the third axial end of the second ring 13 and the second axial end of the first ring 12 at angularly spaced positions in the axial direction of the rings. The joint pillars 14a are connected to the third axial end and the second axial end to thereby the first and second rings 12 and 13 each other. Accordingly, there is nothing within the first and the second rings 12 and 13, which are maintained hollow.

The joint pillars 14d define four side holes or windows 14b between the first ring 12 and the second ring 13. The side holes 14b communicate with the hollow space in the first and the second rings 12 and 13 and therefore with spaced defined by the connecting plates 15a–15c.

Figure 15:
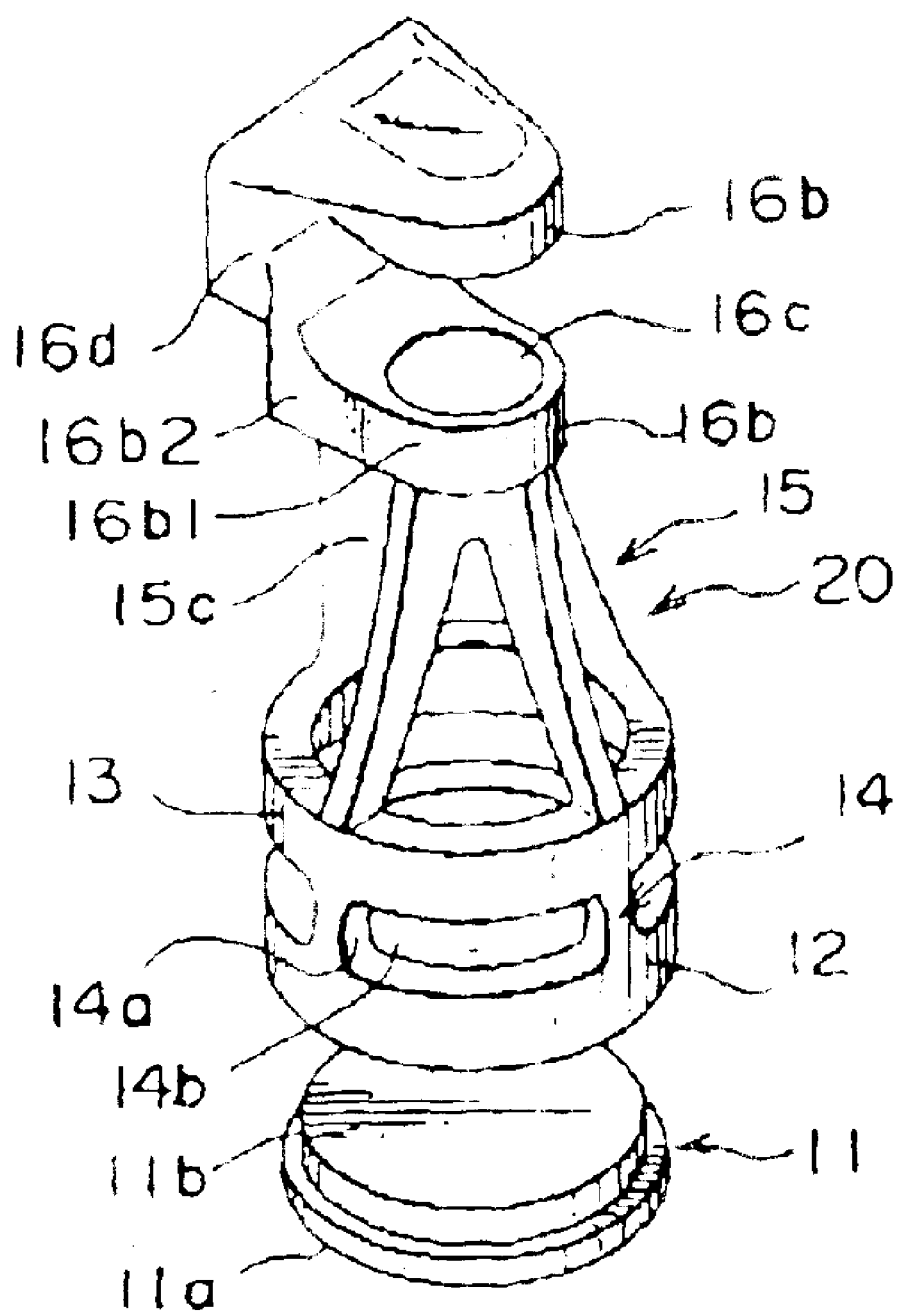
FIG. 15 is another exploded, perspective view showing the piston unit of FIG. 13.
Figure 16:
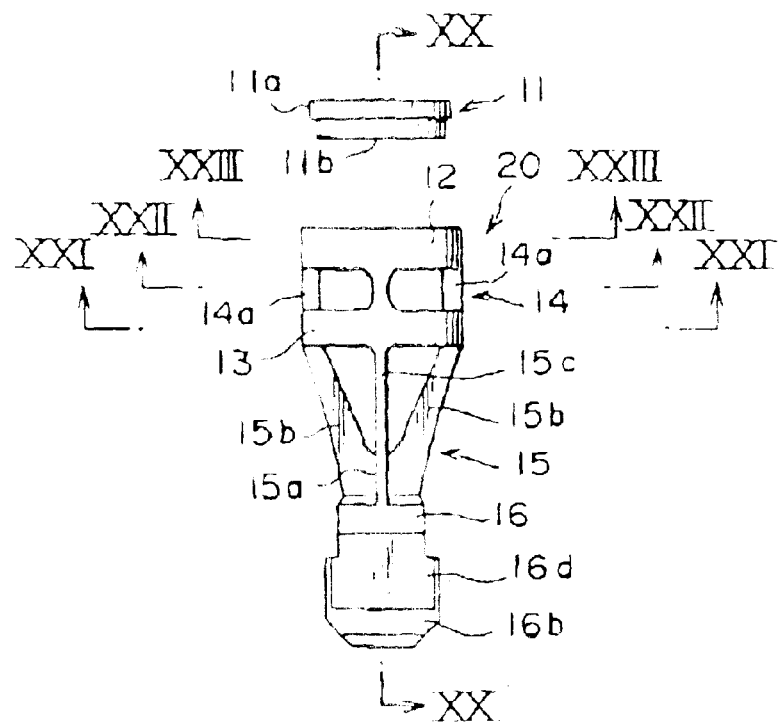
FIG. 16 is a top plan view showing the piston unit of FIG. 13.
Figure 17:
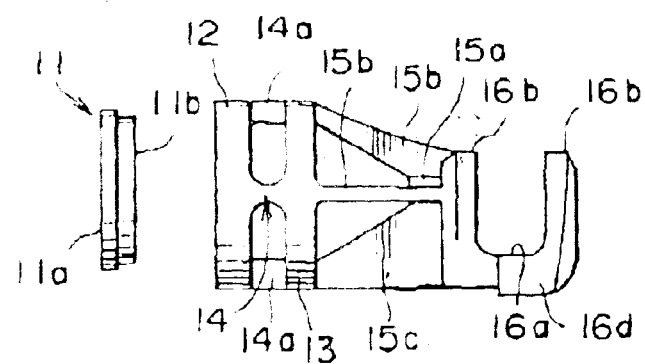
FIG. 17 is a left side view showing the piston unit of FIG. 13.
Figure 18:
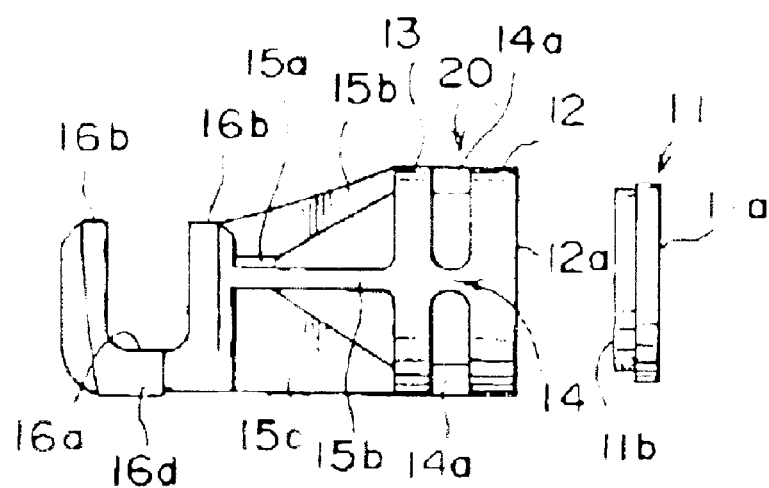
FIG. 18 is a right side view showing the piston unit of FIG. 13.
Figure 19:
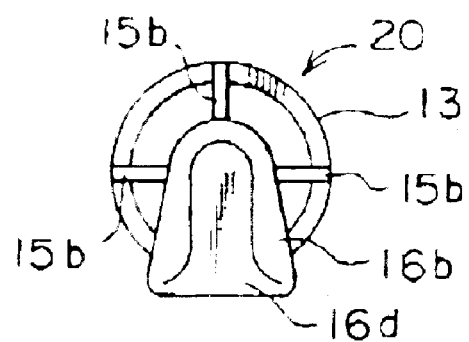
FIG. 19 is, a rear view showing the piston unit of FIG. 13.
Figure 20:
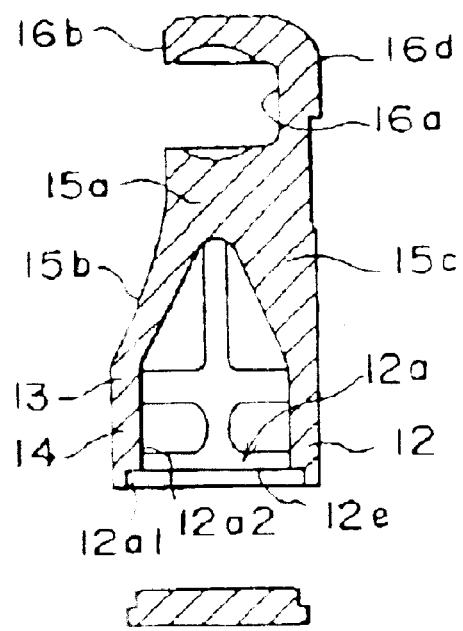
FIG. 20 is a sectional view of the piston unit taken along lines XX—XX of FIG. 16.
Figure 21:
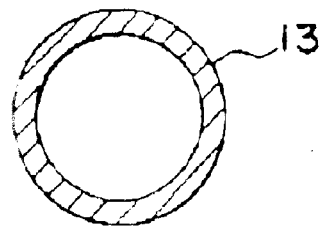
FIG. 21 is a sectional view of the piston unit taken along lines XXI—XXI of FIG. 16.

The compression member 11 also is similar to the compression member 1 in the first embodiment except that not four quarter-circle bulges but a single circular plate 11b is fixedly mounted on a circular disc portion 11a, as shown in FIGS. 13 and 15. The compression member 11 is also made of resin. However, it may be made of light metal. In other embodiment, one of the dick portion 11a and the circular plate 11b can be made of light metal while the other made of resin. The disc portion 11a has a diameter same as the first hole 12a1 of the first ring 12. The disc portion 11a has two surfaces, one of which constitutes a compression surface 11a1 for compressing a fluid object in the cylinder 57 of the compressor 50. On the other surface of the disc portion 11a, the circular plate 11b is formed. The circular plate 11b has a smaller diameter than the disc portion 11a. The diameter of the circular plate 11b is equal to that of the second hole 12a2 of the first ring 12.

The compression member 11 is fitted into the first ring 12 so that the first axial end 12c of the first ring 12 and the compression surface 11a1 are flush with each other. In detail, the disc portion 11a is fitted within the first hole 12a1 of the holder portion 12 and is in contact with the inner step 12e, while the circular plate 11b is also fitted to the second hole 12a2 of the first ring 12. The compression member 11 is fixed to the first-ring 12 by the use of an adhesive agent.

Although not illustrated in this embodiment, the piston 20 may be provided with first and second piston rings similar to the first and the second piston rings 7 and 8 of the first embodiment.

With this structure, the piston unit 20 is significantly small in weight comparing the pit on unit 10 of the first embodiment by the structure where the cruciform portion of the joint portion in the latter is omitted.

In the second embodiment, the connecting plates 15b and 15c and the joint plates 14a do not extend on the inner surface of the second ring 13 and the first ring 12. However, it will be noted by those skilled in the art that the connecting plates 15b and 15c and the joint plates 14a may radially be extended inward. The portions extended radially inward are connected to radial projections formed on the inner surface of the first ring 2 and the second ring 3, to thereby form ribs extending from the tail portion 6 to the inner surface of the first ring 2 along the connecting plates 15b and 15c, second ring 3, join plates 14a, and first ring 2. The ribs strengthen the skirt portion.

This invention has been described in detail in connection with preferred embodiments but is not restricted to the embodiments and modifications and other designations can be made by those skilled in the art within the scope and spirits of the invention claimed in the claims.

What is claimed is:

1. A piston unit comprising a piston, which has a compression end surface, and a connecting element, which is fixed to the piston and extends therefrom opposite to the compression end surface, the piston having a piston outer diameter, wherein the piston comprises:
   a first ring having an outer diameter equal to the piston outer diameter and having a first axial end and a second axial end opposite to the first axial end;
   a second ring having an outer diameter equal to the piston outer diameter and having a third axial end and a fourth axial end;
   joint member jointing the first and the second rings to each other between the second axial end of the first ring and the third axial end of the second ring at angularly-spaced positions, so that the first and second rings are disposed on the same center axis and apart from each other in the axial direction; and
   a circular disk member fixedly mounted in and closing the first axial end of the first ring, and having an exposed surface, as a compression end surface, out of the first ring;
   and wherein said connecting element is fixed to the fourth axial end of the second ring at angularly-spaced positions.

2. The piston unit according to claim 1, wherein the circular disk member is made of resin.

3. The piston according to claim 2, wherein the circular disk member is formed by direct-molding of resin in the hole at the first axial end of the first ring.

4. The piston unit according to claim 1, wherein the first ring, the second ring and the joint members are integral with each other to form a single body.

5. The piston unit according to claim 1, wherein the first ring, the second ring, the joint members and the connecting element are integral with each other to form a single body.

6. The piston unit according to claim 1, wherein said first ring has a first annular groove in the outer surface, and a first piston ring is fitted in the first annular groove.

7. The piston unit according to claim 6, wherein said first piston ring is made of resin.

8. The piston unit according to claim 6, wherein said second ring has a second annular groove in the outer surface, and a second piston ring is fitted in the second annular groove.

9. The piston unit according to claim 8, wherein said second piston ring is made of resin.

10. The piston unit according to claim 1, wherein the circular disk member is fitted in the first axial end of the first ring in the radial direction and a periphery of the circular disk member is wholly surrounded by the first ring.

11. The piston unit according to claim 10, wherein the first ring has a circular periphery in the radial direction, and the circular periphery has a predetermined length in an axial direction so as to wholly surround the periphery of the circular disk member.

12. The piston unit according to claim 1, wherein the second axial end of the first ring and the third axial end of the second ring are parallel to each other.

13. The piston unit according to claim 1, wherein the connecting element is smaller than the first ring and the second ring in the radial direction.

14. The piston unit according to claim 1, wherein the joint member is comprised of a plurality of joint elements, each of which extends from the third axial end of the second ring to the second axial end of the first ring to connect the first ring and the second ring at angularly-spaced positions so that the joint elements define angularly-spaced windows between the first ring and the second ring.

15. The piston unit according to claim 14, wherein each of the joint elements is a pillar.

16. The piston according to claim 15, wherein the connecting element has a tail portion at its tail end opposite to the second ring and comprises a center portion and a plurality of plates crossed at the center portion; the plates extend from the tall portion in the axial direction and away from the center portion and from each other towards the fourth axial end of the second ring; each of the plates is connected to to the fourth axial end surface of the second ring.

17. The piston unit according to claim 14, wherein the joint elements are plates, which extend towards the center axis of the rings in the radial direction and are connected to each other on the center axis to form a center potion.

18. The piston unit according to claim 17, wherein the connecting element has a tail portion at its tail end opposite to the second ring and comprises a center portion and a plurality of plate portions; the center portion extends in the axial direction from the tail portion to a center of the second ring; each of the plate portions is connected to the center portion and to the inner surface and the fourth axial end of the second ring, and the center portion and the plate potions of the connecting element are connected and continue to the center portion and the joint plates of the joint member.

19. The piston unit according to claim 18, wherein the joint plates axially extend into the first ring and are connected to an inner surface of the first ring and divide an interior of the first ring into a plurality holes defined by the plate portions and the inner surface of the first ring.

20. The piston unit according to claim 19, wherein the circular disk member comprises a plurality of bulges on a surface opposite to the compression end surface in the axial direction; and each of the bulges is fitted into the corresponding one of the holes divided in the first ring.

21. The piston according to claim 1, wherein the connecting element is made of metal.

22. The piston according to claim 1, wherein the circular disk member is fixed to an inner surface of the first ring by an adhesive agent.

23. A piston compressor comprising a plurality of the piston units according to claim 1, and a plurality of cylinders, into each of the cylinders the corresponding piston unit being inserted so as to be slidable in an axial direction of the cylinder.

24. The piston compressor according to claim 23, wherein the piston unit has a constant outer surface contact with an inner surface of the corresponding cylinder.

25. The piston compressor according to claim 23, being of a swash-plate type.

* * * * *